July 10, 1923.
J. A. HILL
1,461,121
AUTOMATIC TRANSMISSION RELEASE FOR MOTOR VEHICLES
Filed Sept. 30, 1921    2 Sheets-Sheet 1
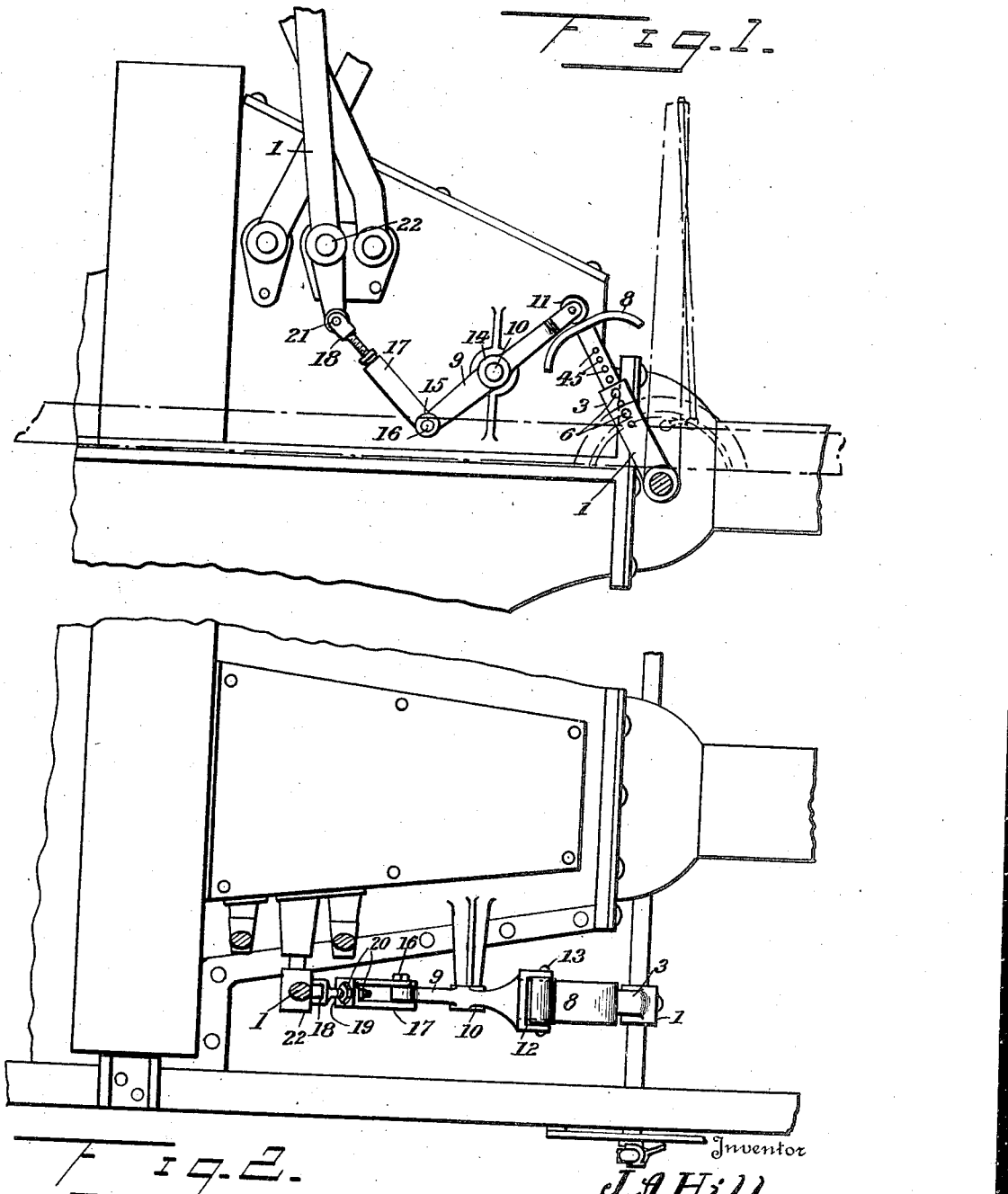

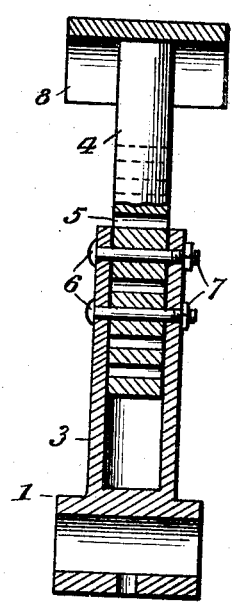
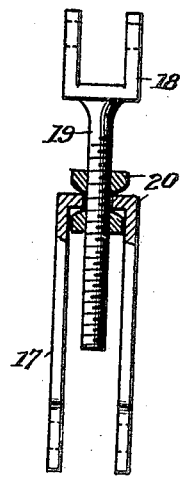
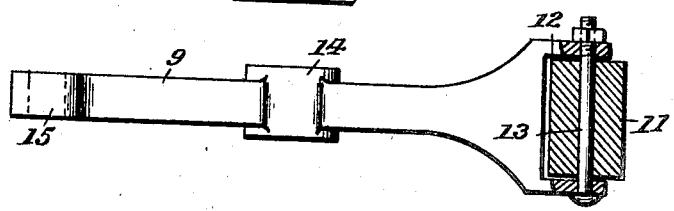

Patented July 10, 1923.

1,461,121

UNITED STATES PATENT OFFICE.

JESSE A. HILL, OF SOUTH GREENFIELD, MISSOURI.

AUTOMATIC TRANSMISSION RELEASE FOR MOTOR VEHICLES.

Application filed September 30, 1921. Serial No. 504,486.

*To all whom it may concern:*

Be it known that I, JESSE A. HILL, a citizen of the United States, residing at R. #2, Box 35, South Greenfield, in the county of Dade and State of Missouri, have invented certain new and useful Improvements in Automatic Transmission Releases for Motor Vehicles, of which the following is a specification.

The invention has relation to certain new and useful improvements in an automatic release for transmission of motor vehicles, particulary the small and light class of cars such as the Ford.

This invention has for another object the provision of a releasing device of the character stated which may be readily attached to a car now in use or incorporated in new cars as they are manufactured and assembled, the device being of simple construction and operation and connected with the clutch pedal and lever so that the transmission will be instantly and automatically released as the clutch pedal is operated.

The invention has for a further object the provision of a transmission release of the character stated which may be readily adjusted to compensate for wearing of parts or whenever any adjustment may be needed to cause better operation of the device, without the necessity of the removing the parts from the machine.

With the foregoing and other objects in view as will appear as the description proceeds, the invention consists in the novel construction, combination and arrangement of co-operating elements as hereinafter more specifically set forth, claimed and shown in the accompanying drawings forming a part of the present application and in which:—

Figure 1 is a side elevation of a portion of the motor vehicle with my invention applied thereto.

Figure 2 is a top plan view thereof, with the clutch pedal shown in section.

Figure 3 is an enlarged detail section through the transmission relieving member and release.

Figure 4 is a detail elevation of the adjustable fork connection, shown on an enlarged scale and with parts in section.

Figure 5 is a detail enlarged plan view of the release arm with the roller mounted in one end, the roller and the mounting for the same being shown in section.

Referring more in detail to the drawings in which similar reference characters designate corresponding parts throughout the several views, 1 indicates the reliever or releaser and 2 the clutch pedal, which are already found on the machines to which this device is to be applied. The releaser or reliever for the transmission, is shown as being of telescopical form and including the tube 3 and the rod 4 adapted to be adjusted within the tube 3. The rod 4 is provided with a plurality of spaced transverse openings 5 through which may be extended the bolts 6 projecting through the tube 3, adjacent the open upper end thereof. This provides for ready adjustment of the releaser or reliever 1, longitudinally. The bolts 6 may be readily secured in position or removed, as it is proposed to provide the nuts 7 or other removable members upon one end thereof, as shown in detail in Fig. 3 of the drawings. The plate or head 8 for the reliever or releaser 1 is carried on the upper portion or end of the rod 4, as will be understood by referring to the drawings.

The rock arm or clutch lever 9 is mounted at the side of the engine casing and fastened to shaft of the transmission mechanism, as shown in Figs. 1 and 2 of the drawings and carries the roller 11 in its forked forward end 12, the arm 19 mounted so that the roller 11 rests upon and rides on the upper face of the head 8 of the releasing or relieving member 1. The roller 11 may be removably mounted in the arm 9 by means of a supporting and bearing rod 13, as shown in Fig. 5 or in any other suitable and well known manner. This arm 9 is preferably enlarged at its central portion, as shown at 14 and at which point it is mounted upon the engine frame or casing, as previously stated. The arm 9 has an enlarged eye 15 formed at its opposite or rear end to receive a pivot member 16.

An adjustable connection is formed between the lower end of the clutch pedal 2 and the arm 9 by means of the double fork comprising the lower fork member 17 and the upper fork member 18. The lower fork member 17 has its bifurcated lower end mounted on the pivot member 16 while the threaded shank 19 depending from the upper fork 18 is extended through an opening in the upper end of the lower fork member 17, as shown in detail in Fig. 4 and held in adjusted position therein by a pair of stop members or nuts 20 threaded thereon and bearing against opposite faces of the upper end of said lower fork member 17. The upper fork member 18 has its bifurcated portion or upper ends mounted on the pivot member 21 carried in the lower extremity of the clutch pedal 2, at a point below the fulcrum point of said clutch pedal, indicated at 22 in Fig. 1 of the drawings. It will therefore be seen that the connection between the clutch pedal 2 and the arm 9 may be readily regulated as required and the length of the relieving member for the transmission mechanism may be readily increased or decreased, as the case may require.

It is believed that the complete construction and operation of the device may now be readily understood from the foregoing paragraphs taken in connection with the accompanying drawings without further detailed description. It may be briefly stated, however, that friction may be reduced to the minimum owing to the engagement of the roller 11 with the head 8 of the transmission relieving and releasing member 1 and by employing this device, the transmission mechanism may be readily released with the operation of the clutch pedal, thereby considerably increasing the efficiency of motor vehicles which have not to the present time been provided with a quick release and relieving mechanism for the transmission.

While the preferred embodiment of the invention has been shown and described, it will be understood that minor changes in the details of construction and arrangement of parts may be resorted to within the scope of what is claimed without departing from the spirit of the invention.

What is claimed is:—

1. A clutch release for a motor vehicle transmission mechanism including in combination with the clutch pedal, and a clutch lever adjustably connected to one end thereof, of a releasing member carried by the control shaft of said motor vehicle, said releasing member including a tubular sleeve, a rod adjustably mounted in said sleeve and having an arcuate-shaped head at its upper end, and an anti-friction roller on the free end of said clutch lever and adapted for engagement with said arcuate-shaped head on said rod.

2. A clutch release for a transmission mechanism of a motor vehicle includuing in combination with a clutch pedal and a clutch lever adjustably connected at one end therewith, of a releasing member carried by the control shaft of said motor vehicle, said releasing member comprising a tubular sleeve provided with spaced registering apertures in the upper end thereof, a rod slidably mounted in the upper end of said tubular member and provided with transverse apertures adapted to register with the apertures in the upper end of said tubular member, locking pins adapted to extend through said tubular member and through said registering apertures therein and in said rod for holding said rod in adjusted position in said tubular member, the upper end of said rod provided with an arcuate-shaped head, and an anti-friction roller journaled in the free end of said clutch lever and adapted for engagement with said arcuate-shaped head.

3. A clutch release for the transmission mechanism of a motor vehicle including in combination with the clutch pedal, and a clutch lever adjustably connected to the lower end of said clutch pedal, said connection including a substantially U-shaped member having its outer ends connected to said clutch lever and the crown portion thereof provided with an opening, a fork-shaped member having its shank threaded and adapted to extend through the aperture in said crown portion of said U-shaped member, the arms of said forked portions adapted to engage and receive the lower end of said clutch pedal, nuts threaded on said shank on each side of the crown portion of said U-shaped member for holding said forked shaped member in adjusted position with respect thereto, of a releasing member carried by the controller shaft of said motor vehicle, and an anti-friction roller carried by the free end of said clutch lever for engagement with said releasing member.

In testimony whereof I affix my signature.

JESSE A. HILL.